United States Patent
Dombrowski et al.

(10) Patent No.: US 7,925,838 B2
(45) Date of Patent: *Apr. 12, 2011

(54) DIRECTORY-BASED DATA TRANSFER PROTOCOL FOR MULTIPROCESSOR SYSTEM

(75) Inventors: Chris Dombrowski, Cary, NC (US); Marcus L. Kornegay, Morrisville, NC (US); Ngan N. Pham, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 302 days.

This patent is subject to a terminal disclaimer.

(21) Appl. No.: 12/137,618

(22) Filed: Jun. 12, 2008

(65) Prior Publication Data

US 2008/0313427 A1 Dec. 18, 2008

Related U.S. Application Data

(63) Continuation of application No. 11/322,955, filed on Dec. 30, 2005, now Pat. No. 7,404,045.

(51) Int. Cl.
*G06F 12/00* (2006.01)
(52) U.S. Cl. ....................................................... 711/141
(58) Field of Classification Search ........................ None
See application file for complete search history.

(56) References Cited

U.S. PATENT DOCUMENTS

| 6,052,762 | A | | 4/2000 | Arimilli et al. |
| 6,078,997 | A | * | 6/2000 | Young et al. ................... 711/144 |
| 7,404,045 | B2 | * | 7/2008 | Dombrowski et al. ........ 711/141 |

OTHER PUBLICATIONS

Grahn, Hakan, et al; *Efficient Strategies for Software-Only Directory Protocols in Shared-Memory Multiprocessors*; ISCA 1994, Santa Margherita Ligure, Italy; pp. 38-47.
Lenoski, Daniel, et al; *The DASH Prototype: Implementation and Performance*; Retrospective, 1995, pp. 80-82.

* cited by examiner

*Primary Examiner* — Hiep T Nguyen
(74) *Attorney, Agent, or Firm* — Steven M. Greenberg, Esq.; Carey Rodriguez Greenberg Paul LLP

(57) ABSTRACT

A system for maintaining data coherency in a multiprocessor system includes a first processor having a cache and a directory, a second processor having a directory, and at least one additional processor having a directory and separate from the first and second processors. The first processor is configured to determine if a data line is not found in the cache of the first processor and forward a request for the data line to the second processor. The second processor is configured to forward the data line from the second processor to the first processor, update the directory of the second processor to reflect the data line being forwarded to the first processor, and forward a directory update message to the at least one additional processor to reflect the data line being forwarded to the first processor. An entry in the directories includes a memory address, a most recent data holder, and a line state.

10 Claims, 3 Drawing Sheets

DIRECTORY-BASED DATA TRANSFER PROTOCOL FOR MULTIPROCESSOR SYSTEM

CROSS-REFERENCE TO RELATED APPLICATIONS

This application is a Continuation of U.S. application Ser. No. 11/322,955, filed on Dec. 30, 2005, which is incorporated herein by reference in its entirety.

BACKGROUND OF THE INVENTION

1. Field of the Invention

The disclosure relates generally to multiprocessor computer systems and, more specifically, to a method and system for maintaining data coherency within a multiprocessor computer system.

2. Description of the Related Art

The issue of data coherency exists when data is distributed throughout a multiprocessor computer system. Data coherency becomes an issue if more than one node/processor of the multiprocessor system attempts to access and/or modify a particular piece of data at nearly the same instant in time or during an overlapping time period. Many different methods have been employed to ensure data coherency, and these methods are typified through the use of a multitude of requests from a requester processor to the other processors and between the other processors in the multiprocessor system to ensure data coherency. For example, if a data line is not found in a cache of a particular processor, the processor may send requests to each of the other processors in the multiprocessor system to determine if the data line is found in one of the caches of the other processors. These transactions/command traffic consumes processor/system resources, and as a result, increases latency within the multiprocessor system. There is, therefore, a need for a system and method that can efficiently maintain data coherency within a multiprocessor system while also reducing transactions and, thus, latency within the system.

BRIEF SUMMARY OF THE INVENTION

Embodiments of the invention address deficiencies of the art with respect to multiprocessor systems and provide a novel and non-obvious system and method for maintaining data coherency within a multiprocessor system. The multiprocessor system includes a first processor having a cache and a directory, a second processor having a directory, and at least one additional processor having a directory and separate from the first and second processors. The first processor is configured to determine if a data line is not found in the cache of the first processor and forward a request for the data line to the second processor. The second processor is configured to forward the data line from the second processor to the first processor, update the directory of the second processor to reflect the data line being forwarded to the first processor, and forward a directory update message to the at least one additional processor to reflect the data line being forwarded to the first processor. An entry in the directories includes a memory address, a most recent data holder, and a line state.

In certain aspects, if the first processor determines that an entry having an address of the data line is not found in the directory of the first processor and the second processor, to which the request is sent, is a home agent of the data line. If the first processor determines that an entry for an address of the data line is found in the directory of the first processor, the request is sent to second processor as the data holder. Also, the first processor is configured to invalidate the entry for the address of the data line in the directory of the first processor after the first processor receives the data line from the second processor. The at least one additional processor configured to update the directory of the at least one additional processor to reflect the data line being forwarded to the first processor responsive to the at least one additional processor receiving the directory update message.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 2A:
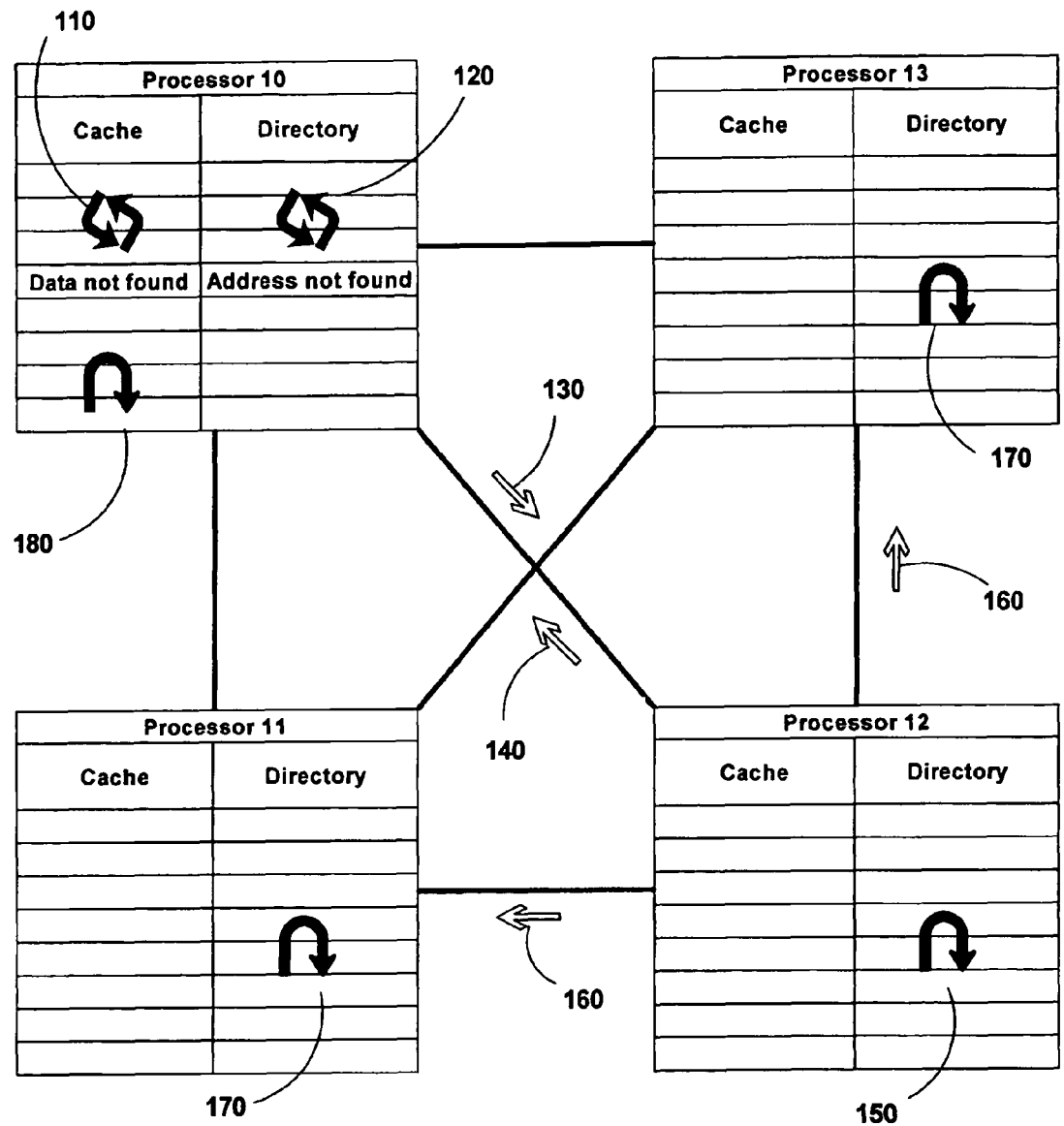
FIGS. 2A and 2B are block diagrams of a multiprocessor computer system respectively for the different methodologies of maintaining data coherency illustrated in FIG. 2.
Figure 2B:
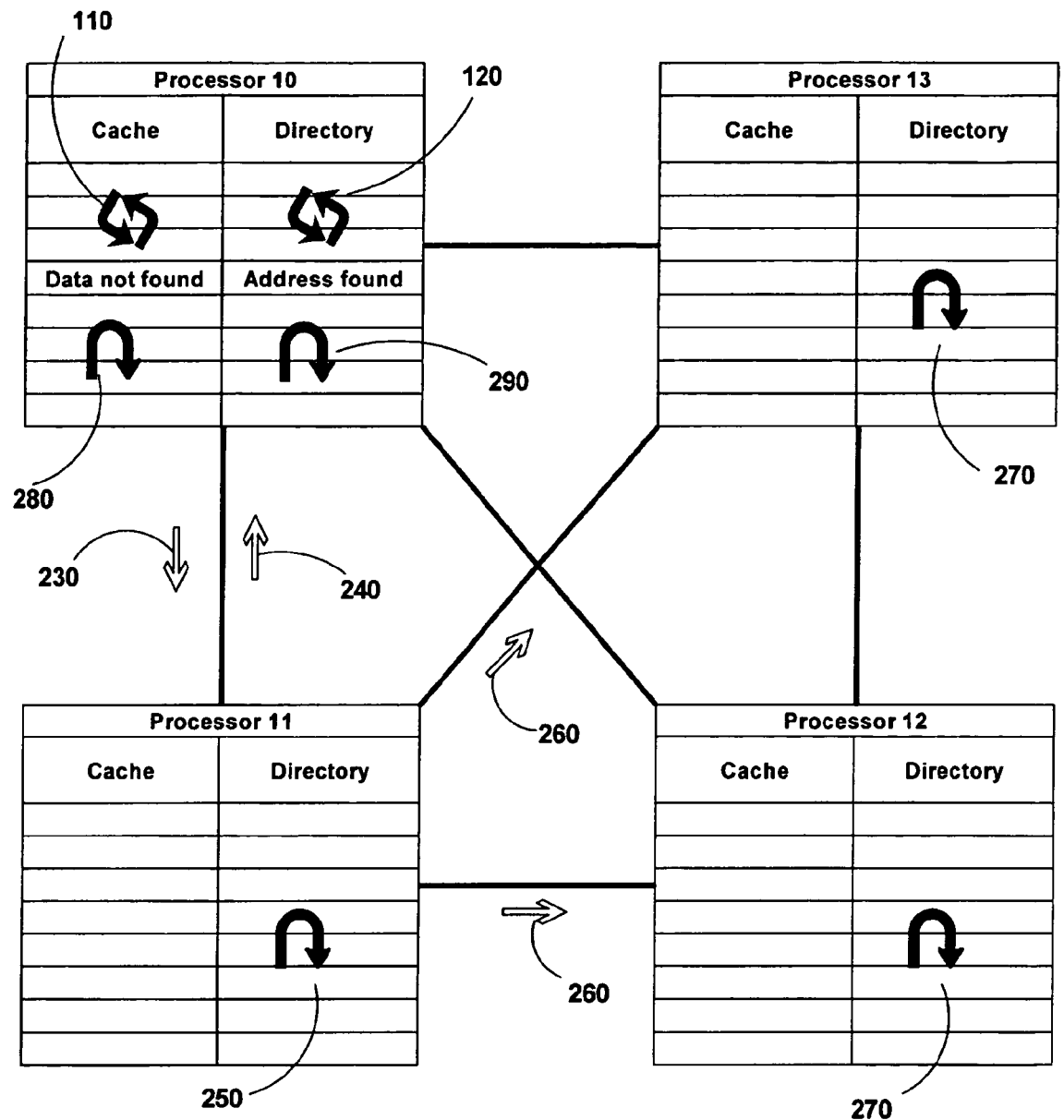

As illustrated in FIGS. 2A and 2B, each processor 10, 11, 12, 13 of a multiprocessor system includes a data cache for storing data lines and a directory. The directory is a storage repository indicating how data lines have flowed through the multiprocessor system. Although not limited in this manner, each directory entry for a data line may include a memory address of the data line, the most recent holder of the data line, and a state of the data line. As an example, the line state may be that a processor has exclusive ownership of the data line, the data line may be read-only, or the data line has been modified.

Figure 1:
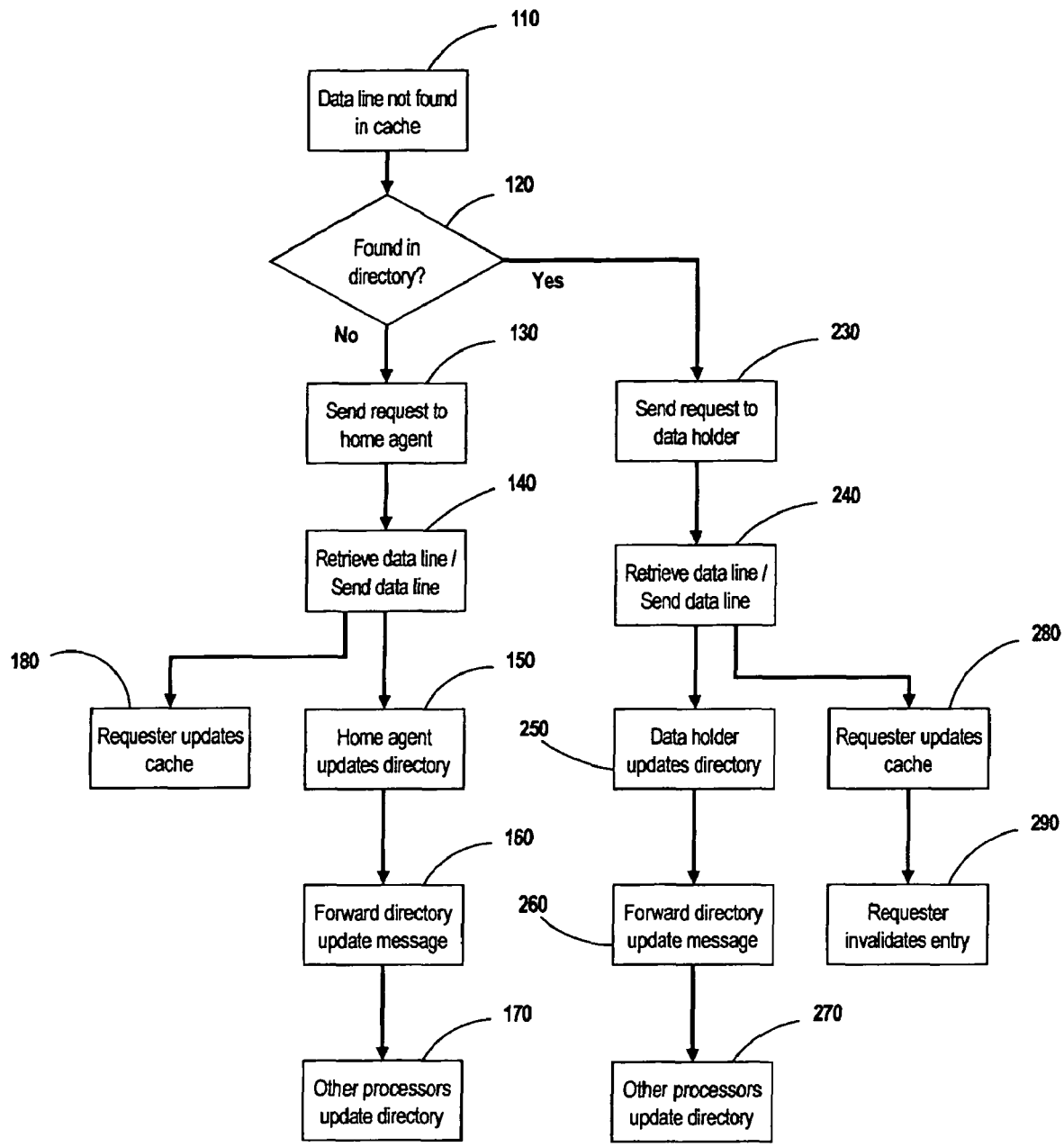
FIG. 1 is a flow chart diagram illustrating a method of maintaining data coherency in the multiprocessor computer system in accordance with the inventive arrangements.

An exemplar methodology for maintaining data coherency in a multiprocessor system is illustrated in FIG. 1. In step 110, the processor 10 has already searched its last level cache for a data line to be used in executing a program and determined that the data line is not present in the last level cache of the processor 10. In step 120, which may occur concurrently with step 110, the processor 10 searches the directory in the processor 10 for an address of the data line.

If an address for the data line is found in the directory of the processor 10, the method proceeds to steps 230-290, which will be discussed subsequently with regard to FIG. 2B. If, however, an address for the data line is not found in the directory of the processor 10, the method proceeds with steps 130-180, which are also shown in FIG. 2A. In step 130, the processor 10 sends a request to a home agent (i.e., processor 12), which is the owner of the data line, via an address routing table. The address routing table maps where the memory address begin and end for memory associated with each processor.

In step 140, the processor 12 retrieves the data line from memory and sends the data line to the requesting processor 10. In step 150, which may occur concurrently with step 140, the processor 12 updates its own directory to reflect that the data line was sent to the requesting processor 10. In step 160, the processor 12 forwards a directory update message to other processors 11, 13 within the multiprocessor system. In step 170, these other processors 11, 13 also update their directories to reflect that the data line was sent to the requesting processor 10. In step 180, the requesting processor 10 receives the data line from the processor 12, and the requesting processor 10 places the data in its own cache. Although not limited in this manner, the requesting processor 10 is not required to update its own directory to reflect the data line being sent to the requesting processor 10 since the data line currently resides in the cache of the requesting processor 10.

If an address for the data line is found in the directory of the processor 10, in step 230, the processor 10 sends a request to the data holder (i.e., processor 11), based upon the address found in the directory of the processor 10. In step 240, the processor 11 retrieves the data line from memory and sends the data line to the requesting processor 10. In step 250, which may occur concurrently with step 240, the processor 11 updates its own directory to reflect that the data line was sent to the requesting processor 10. In step 260, the processor 11 forwards a directory update message to other processors 12, 13 within the multiprocessor system. In step 270, these other processors 12, 13 also update their directories to reflect that the data line was sent to the requesting processor 10. In step 280, the requesting processor 10 receives the data line from the processor 11, and the requesting processor 10 places the data in its own cache. In step 290, the requesting processor 10 invalidates the entry for the data line in its own directory because that entry is no longer accurate.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A system for maintaining data coherency in a multiprocessor system, comprising:
    a first processor having a cache and a directory;
    a second processor having a directory; and
    at least one additional processor having a directory and separate from the first and second processors, wherein
    the first processor configured to
        determine if a data line is not found in the cache of the first processor, and
        forward a request for the data line to the second processor, and
    the second processor configured to
        forward the data line from the second processor to the first processor,
        update the directory of the second processor to reflect the data line being forwarded to the first processor, and
        forward a directory update message to the at least one additional processor to reflect the data line being forwarded to the first processor.

2. The system of claim 1, wherein the first processor determines that an entry having an address of the data line is not found in the directory of the first processor.

3. The system of claim 2, wherein an entry in the directory of the first processor includes a memory address, a most recent data holder, and a line state.

4. The system of claim 2, wherein the second processor is a home agent of the data line.

5. The system of claim 1, wherein the first processor determines that an entry for an address of the data line is found in the directory of the first processor.

6. The system of claim 5, wherein an entry in the directory of the first processor includes a memory address, a most recent data holder, and a line state.

7. The system of claim 5, wherein the address of the data line indicates that the second processor is a data holder.

8. The system of claim 5, wherein the first processor configured to invalidate the entry for the address of the data line in the directory of the first processor after the first processor receives the data line from the second processor.

9. The system of claim 1, wherein the at least one additional processor configured to update the directory of the at least one additional processor to reflect the data line being forwarded to the first processor responsive to the at least one additional processor receiving the directory update message.

10. The system of claim 1, wherein an entry in the directory includes a memory address, a most recent data holder, and a line state.

* * * * *